June 13, 1961 F. S. LAPEYRE ET AL 2,987,759
MACHINE FOR PEELING CRAWFISH AND THE LIKE
Filed Oct. 25, 1957 6 Sheets-Sheet 1
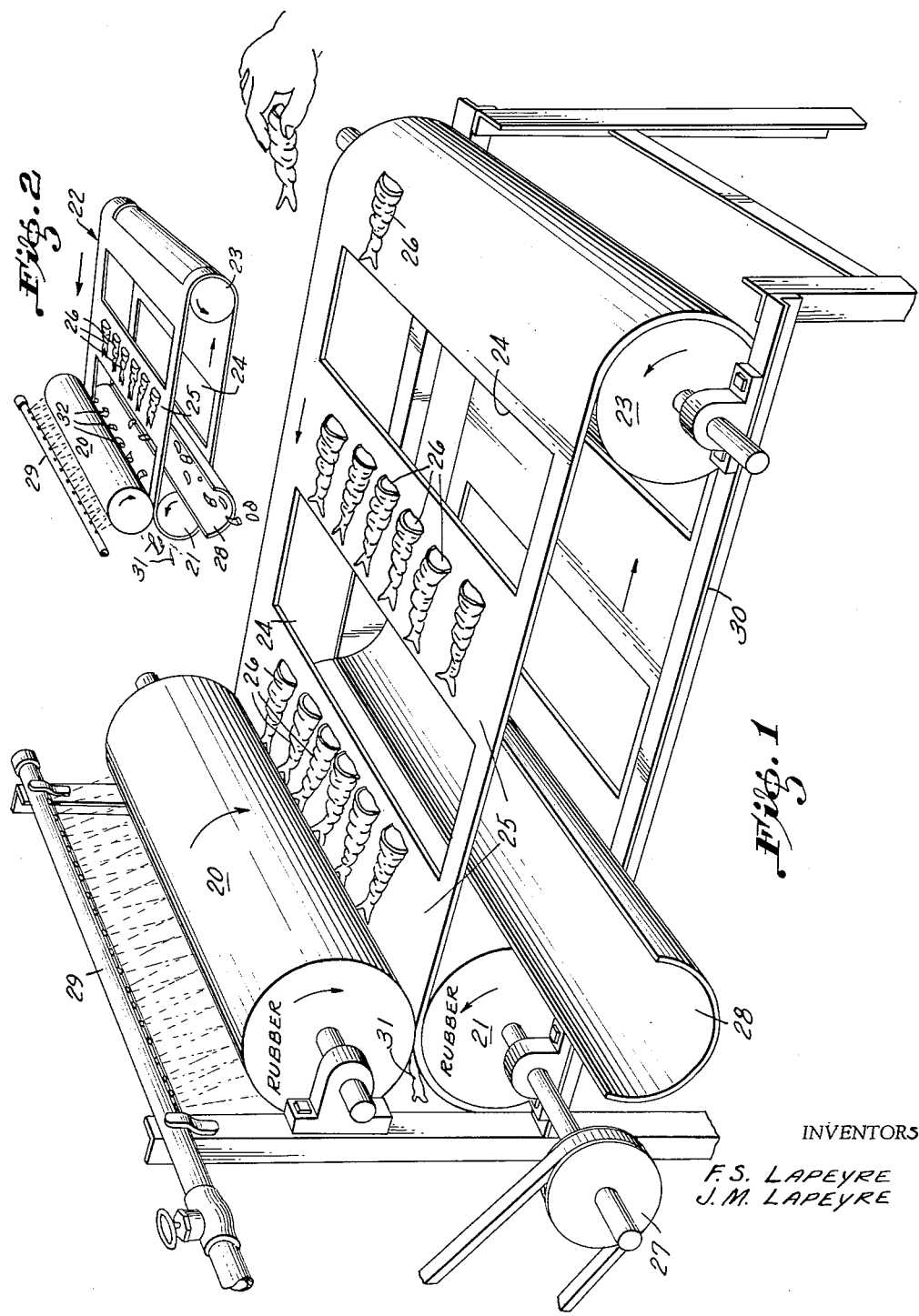
INVENTORS
F.S. LAPEYRE
J.M. LAPEYRE

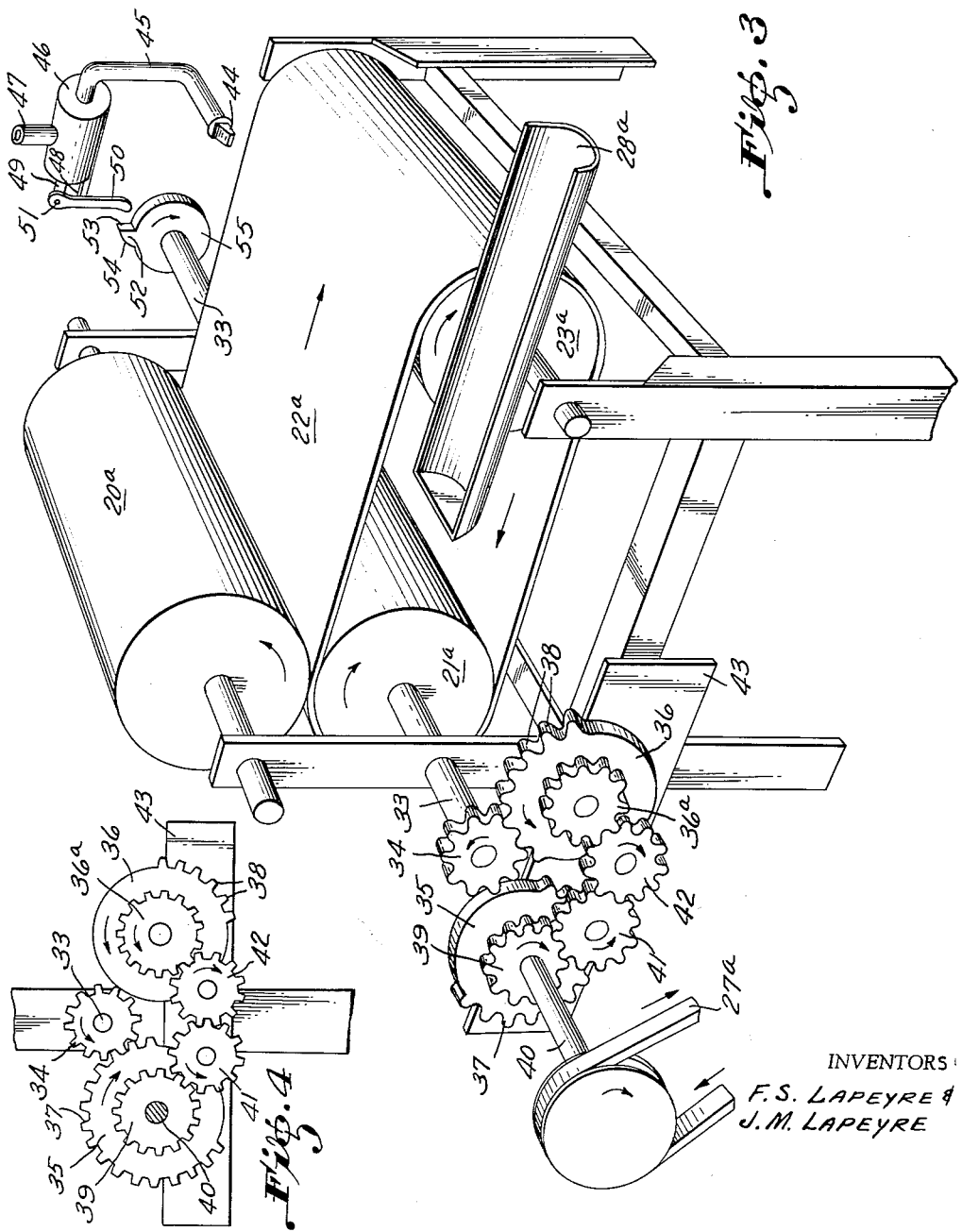

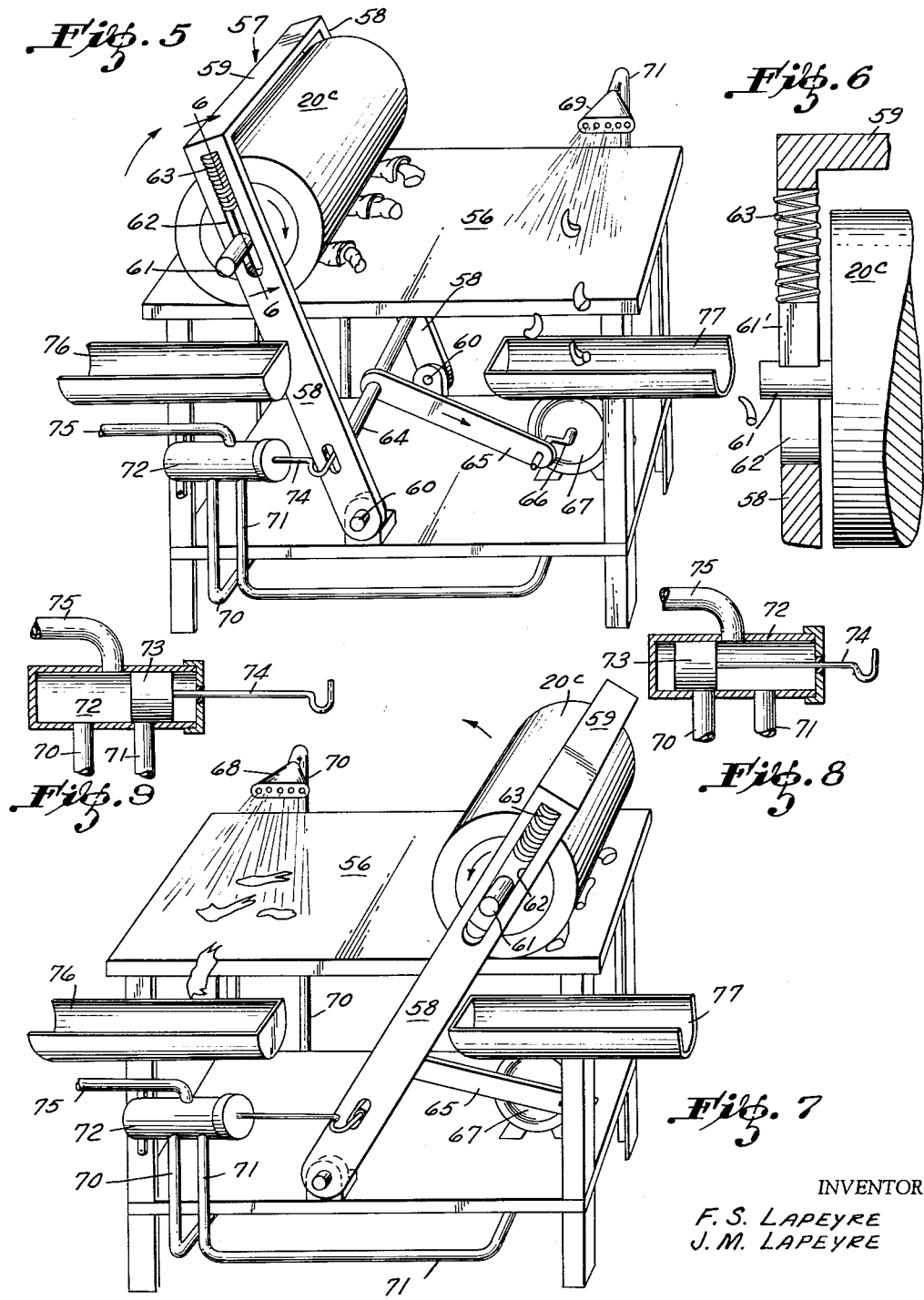

June 13, 1961 F. S. LAPEYRE ET AL 2,987,759
MACHINE FOR PEELING CRAWFISH AND THE LIKE
Filed Oct. 25, 1957 6 Sheets-Sheet 4
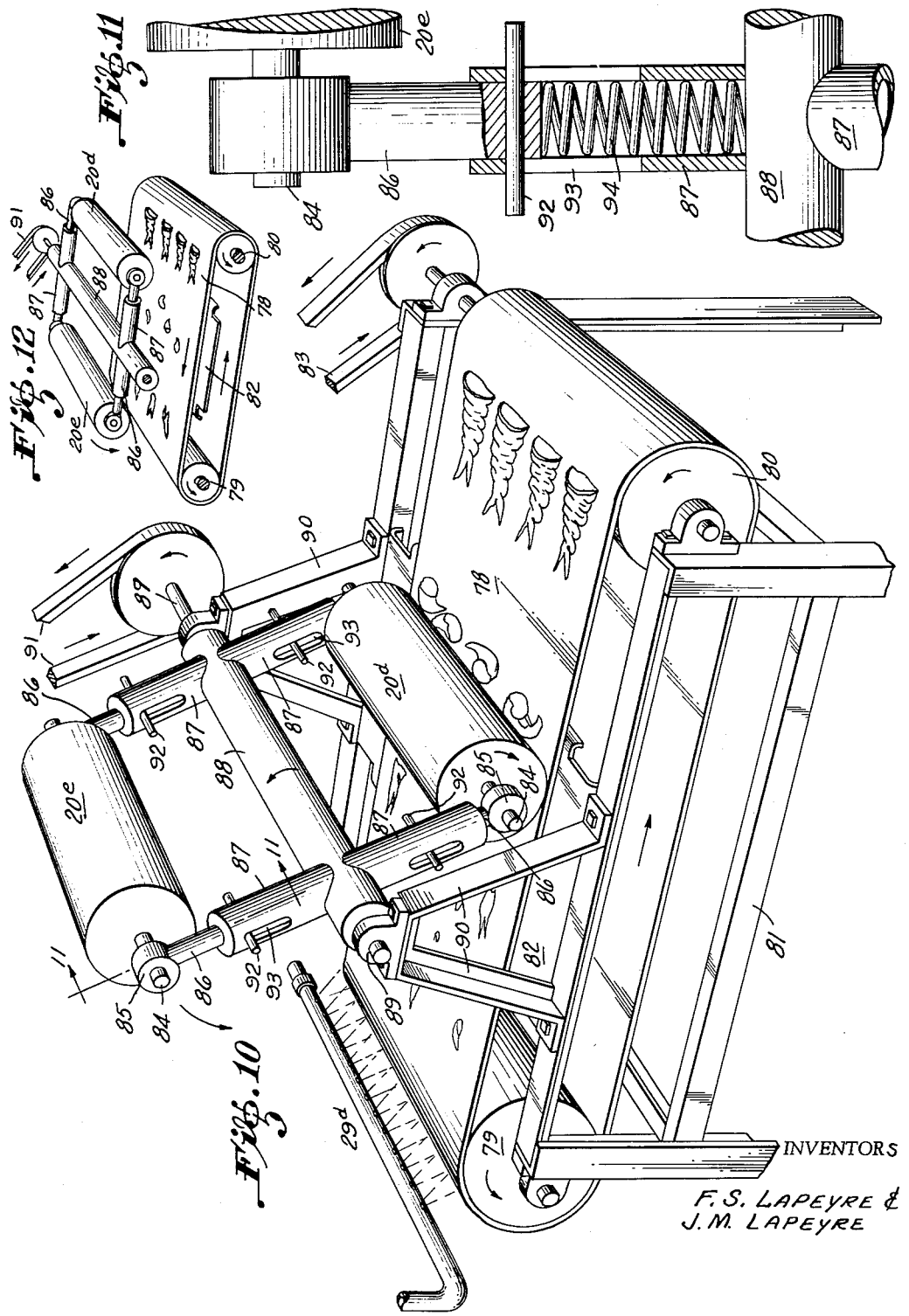
INVENTORS
F. S. LAPEYRE &
J. M. LAPEYRE

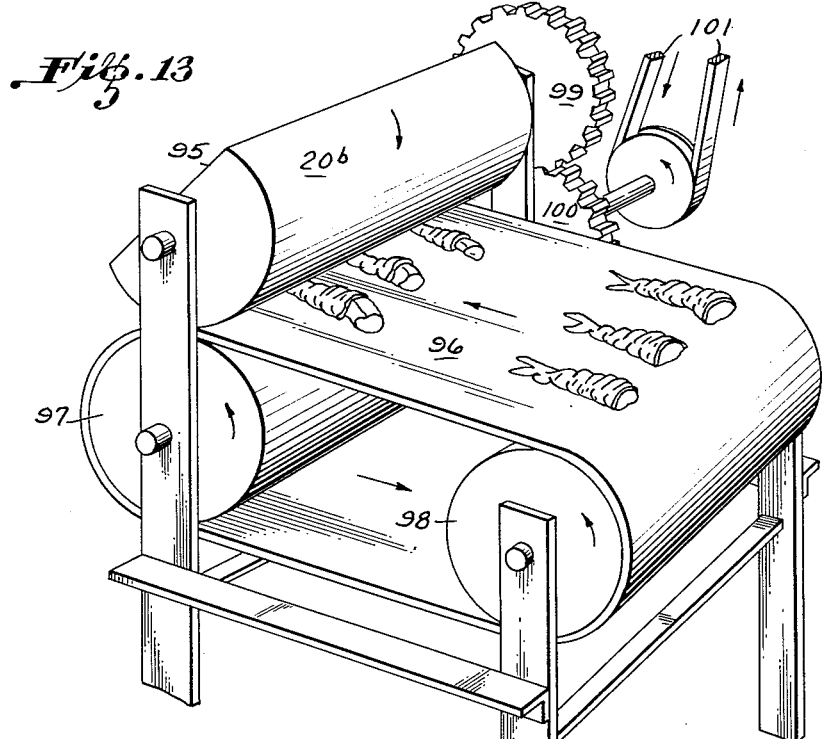
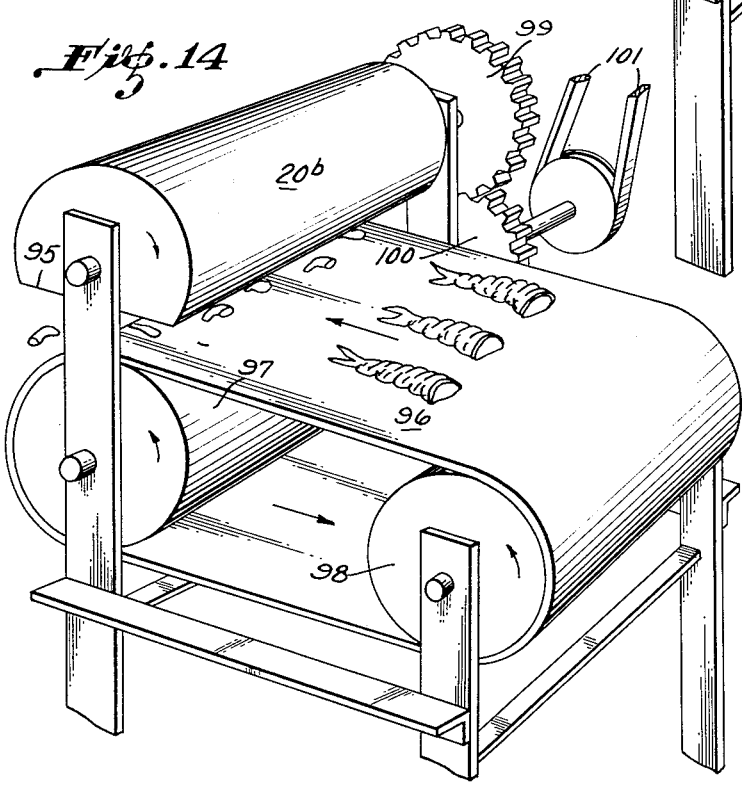

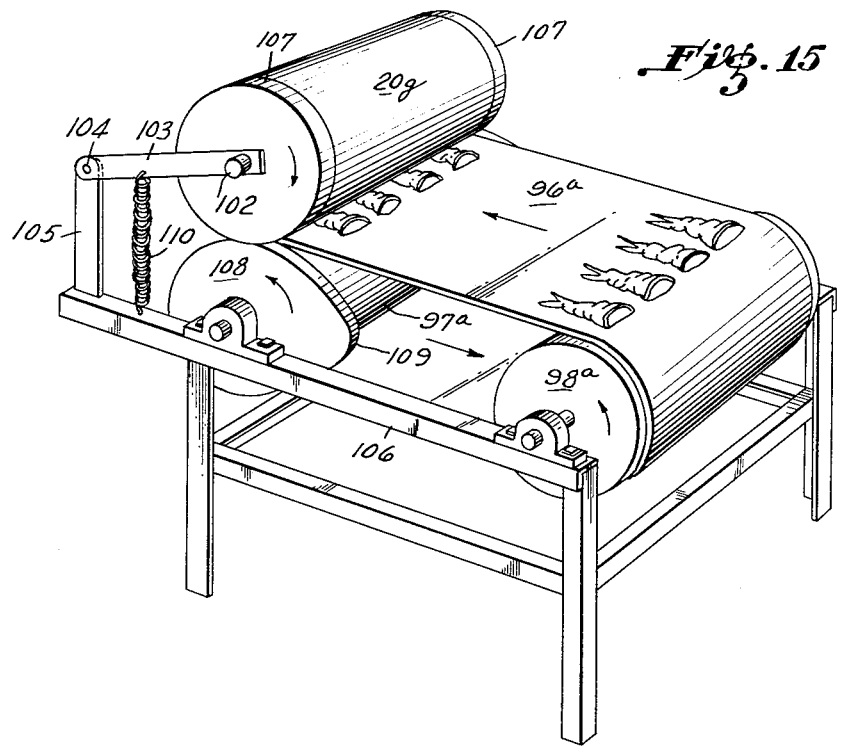
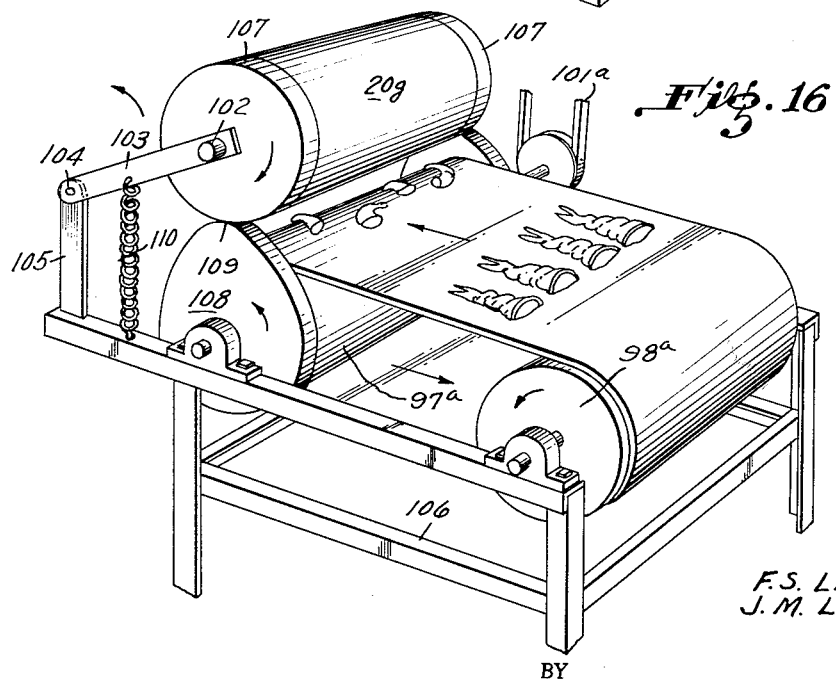
INVENTORS
F.S. LAPEYRE &
J.M. LAPEYRE
BY
ATTORNEYS

United States Patent Office 2,987,759
Patented June 13, 1961

2,987,759
MACHINE FOR PEELING CRAWFISH AND THE LIKE
Fernand S. Lapeyre and James M. Lapeyre, New Orleans, La., assignors to The Peelers Company, Houma, La., a partnership
Filed Oct. 25, 1957, Ser. No. 692,496
14 Claims. (Cl. 17—2)

The present invention relates to process and machine for peeling crawfish and the like and has for an object to provide an improved process and an improved machine for peeling such crustaceans as crawfish, shrimp, lobsters and the like in which the shell is pinched or unraveled from the meat by a unit of at least two peeling members associated together to form a peeling nip therebetween which will grasp the rough shells or hulls and pull the same, as trash, through the nip while rejecting the meat due to its slick and slimy nature.

An important object of the invention is to provide a process and machine of the character above indicated in which an elastic or resilient pressure is provided at the nip so as to aid the normal nip pressure to perform a more thorough and effective peeling operation, cleaning the subject crustaceans from all shell and proportionately increasing the value of the peeled meat as a commercial article.

The improved process consists of a series of steps for carrying out the above objects in a minimum of time and generally automatically.

The novel machine comprises new cyclic mechanism for moving the crustaceans up to the peeling nip and when peeled acting automatically to discharge the meat and the trash, generally to different destinations, or to later move the meat in opposite direction from the nip to a point of discharge.

The invention is susceptible of embodiment in many mechanical forms, a few of which are disclosed in the accompanying drawings.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is an isometric view of a form of machine for peeling crawfish and the like and for carrying out steps of the improved process.

FIGURE 2 is a similar view taken on a smaller scale showing a subsequent position of the parts of the machine where the meats are being discharged.

FIGURE 3 is an isometric view of a modified form of machine.

FIGURE 4 is an elevational view of the gearing employed to reverse the drive of the belt.

FIGURE 5 is an isometric view of a further modified form of the machine showing the roller in an initial position.

FIGURE 6 is a sectional view taken on an enlarged scale on the line 6—6 of FIGURE 5 and showing a detail of the elastic pressure means applied to the roller.

FIGURE 7 is also an isometric view, like FIGURE 5, but showing the roller in a subsequent position.

FIGURE 8 is a longitudinal sectional view taken through a form of valve for controlling the supply of fluid pressure to the discharge nozzles.

FIGURE 9 is a similar view showing the subsequent position of the valve.

FIGURE 10 is an isometric view of a still further modified form of the invention involving revolving rollers, one of which is shown in contact with an endless belt backed by a substantially rigid table.

FIGURE 11 is a sectional view taken on an enlarged scale on the line 11—11 of FIGURE 10 and illustrating a means for applying resilient pressure to the roller.

FIGURE 12 is a view similar to FIGURE 10 on a smaller scale showing a subsequent position of the revolving rollers in which the nip is opened to permit the passage of the meats therethrough.

FIGURE 13 is an isometric view of a further modified form of machine involving a split roller shown in peeling position.

FIGURE 14 is a similar view showing the split roller in the open-nip position permitting the meat to pass the same.

FIGURE 15 is an isometric view of a still further modified form of the machine showing a cam mechanism for opening the nip.

FIGURE 16 is a similar view showing the nip in the open position.

Referring more particularly to FIGURES 1 and 2, 20 and 21 represent a pair of rollers associated together to form a peeling nip through which runs an endless belt 22 which may be trained at one end about the roller 21 and at its other end about a roller 23. The belt 22 is provided with spaced slots 24 between which are lands or blank areas for supporting the crawfish 26 or other crustaceans.

A belt or other drive 27 is mounted for instance to the roller 21 whereby to drive the belt 22 so that its upper run 26 containing the crustaceans 26 moves continuously toward the nip between the rollers 20 and 21.

A discharge flume 28 is located between the upper and lower runs of the belt adjacent the peeling nip and in position to receive the peeled meat.

A perforated water or other liquid flushing pipe 29 is mounted in a position to flush water upon the upper roller 20 to cleanse the slime therefrom which is acquired incident to the peeling operation.

The various rollers may be journaled as illustrated in a frame 30.

The removed shells are indicated at 31 and the peeled meat at 32.

In the operation of this form of the device, the crustaceans are placed upon the lands or blank areas 25 of the belt between the slots. This may be done by hand as indicated in FIGURE 1, care being taken to place the tails leading in the direction of movement of the upper run of the belt as indicated by the arrow.

On arrival at the nip the meat will be squeezed from the shells by the pressure at the nip between the rollers 20 and 21. The shells are rough and they are drawn through the nip as indicated at 31. The meat however is slick and slimy and when removed from the shell it slides away from the convergent walls of the nip and when the following slot 24 of the belt arrives at or approaches the nip, the peeled meat 32 falls into the flume 28, which may be inclined laterally if desired in order to convey the recovered meat out laterally of the machine to a suitable receptacle or destination.

One or other of the rollers 20, 21, preferably the upper roller 20 will be made of some resilient or elastic material, such as rubber or a rubber composition and this roller 20 is so fitted to the nip that the mass of the resilient body will exert elastic pressure upon the subject crustaceans. Thus the subjects are squeezed or pinched by the convergent walls of the upper roller 20 and the lower roller 21 acting as a backing for the conveyer 22. The crustaceans are also subjected to the elastic force of the body of the roller 20. The elastic force of the roller 20 may be exerted upon the crustaceans without being fitted under compression against the belt and the lower roller 21 at the nip as any attempt of the crustaceans to pass through the nip would necessarily displace the elastic body at that point which would put the body under a greater compression thus reacting against the crustaceans and more forcibly acting to eject the meat and grasp the shells and pull the same through the nip.

Or the upper elastic roller 20 may be fitted against the nip under compression or slight distortion of its elastic body so that at all times the body 20 will be under compression and reacting expansively against the belt covered lower roller 21 to thus add its compressive elastic and expanding force to the pressure derived from the constriction of the nip.

Accordingly a highly efficient peeling operation is had in which substantially no shell or trash is left upon the meat.

Referring more particularly to FIGURES 3 and 4 20$^a$ indicates an upper roller, preferably elastic, which, in concert with a lower roller 21$^a$ forms the peeling nip with a solid or continuous belt 22$^a$ running through the nip. The belt runs about the drive roller 21$^a$ and an idler roller 23$^a$.

The belt drive is indicated at 27$^a$ and the discharge flume for the peeled meat at 28$^a$.

The shaft 33 which is affixed to the roller 21$^a$ is a follower shaft and to it is affixed a follower pinion 34 disposed in the same plane with a pair of interrupted gears 35 and 36 respectively having toothed segments 37 and 38 which are angularly displaced relatively to one another so that they engage only alternately with the follower pinion 34: for instance gear 35 may be blank for 120° and gear 36 blank for 240°.

A drive pinion 39 is affixed to the shaft 40 and the interrupted gear 35 is likewise affixed to this drive shaft 40 or to the drive pinion 39. The other interrupted gear 36 has affixed thereto a pinion 36$^a$. Two idler pinions 41 and 42 in mesh with one another are respectively in mesh with a drive pinion 39 and the pinion 36$^a$ of the interrupted gear 36.

All of these pinions with the exception of the follower pinion 34 may be conveniently mounted upon a frame 43.

A fluid nozzle 44 is shown as directed across the belt 22$^a$ at a point preferably substantially above the idler roller 23$^a$ and pointing in a lateral direction. This fluid nozzle is connected to a pipe 45 which connects with a valve casing 46 to which fluid under pressure is introduced through a pipe 47 from an appropriate source of supply.

The valve plunger rod 48 is adapted to be moved inwardly by an operating lever 50 pivoted, at 51, upon a lug 49 on the casing 46. The lower free end of the lever 50 is disposed in the path of a finger 52 carried around by a disc 55 which is mounted upon the follower or lower roller shaft 33. The finger 52 is provided with an abrupt wall 53 and with a curved or cam wall 54.

In operation of this form of the invention, crawfish are placed upon the belt 22$^a$ as indicated in FIGURE 1 and the machine put in operation so that the upper run of the belt 22$^a$ moves toward the peeling nip between the rollers 20$^a$ and 21$^a$. This operation is continued for a desired length of time with the shells and trash being pulled through the nip and until an accumulation of peeled meat is had in front of the nip upon the belt. Thereupon the motion of the belt 22$^a$ is reversed to the direction shown by the arrow in FIGURE 3.

It will be understood that the gear train rotates constantly in the same direction but inasmuch as the interrupted gears 35 and 36 move in opposite directions whenever their gear segments 37 and 38 are in contact with the driven pinion 34 the same will necessarily follow the direction of motion imposed. For instance as shown, when the gear segment 37 is in mesh with the follower pinion 34, the latter will be driven in a counterclockwise direction as viewed in FIGURE 3 which will cause the belt 22$^a$ as to its upper run to move toward the peeling nip. However after the gear segment 37 moves out of mesh with the pinion 34 and the companion segment 38 moves into mesh with such pinion 34, it will be apparent that the motion of the shaft 33 and of the roller 21$^a$ will be reversed to that shown by the arrows in FIGURE 3 and consequently the upper run of the belt 22$^a$ will now be moved toward its idler roller 23$^a$. In doing so the peeled meat will be carried back to a position approximately in line with the fluid pressure jet 44. At approximately this time the finger 52 will have arrived into contact with the lever 50. The abrupt surface 53 will react against the lever 50 causing it to swing to the right pushing upon the plunger 48 and operating the valve to open the supply of fluid pressure to the nozzle 44. The peeled meat will thus be blown or swept from the belt 22$^a$ and into the discharge flume 28$^a$ which is placed in a favorable position to catch such peeled meat.

On the return movement, that is when the shaft 33 is being driven in a counterclockwise direction, the rounded or cam surface 54 will act to simply swing the operating lever 54 about its pivot 51 permitting the passage of the finger 52 to the opposite side of the operating lever 50. After such passage the lever 50 will fall by gravity to the position of FIGURE 3.

It will be understood that any other form of gear train may be employed or any reversing motion which may be found adaptable for the purpose.

Referring more particularly to FIGURES 5 to 9 inclusive of the drawings, which show a further modified form of the machine, 20$^c$ indicates a peeling roller which, together with a table 56 constitutes a peeling couple forming a nip into which the crustaceans are fed by the rolling action of the roller 20$^c$ across the table 56. This table constitutes an elongated support which may be flat or of slightly curved form. While the table 56 may have a rubber or other resilient coating of a thin character such support 56 must be in general sufficiently rigid to catch the crustaceans between the same and the roller in order to perform a pinching and peeling operation. The roller 20$^c$ may be rolled back and forth across the table 56 by means of a rocking yoke 57 composed of yoke arms 58 and a cross bar 59.

The lower ends of the yoke arms 59 are pivoted, as indicated at 60 to portions of the table frame. Trunnions 61 of the roller 20$^c$ are slidably fitted in slots 62 in the yoke arms 58 and coil springs 63 which are accommodated in these slots bear at their upper ends against the upper ends of the slots and at their lower ends against sliding blocks 61' which bear upon the trunnions 61.

Beneath the table a cross rod 64, which connects the yoke arms 58 together, is pivoted to a pitman or link 65 which at its other end is coupled to a crank 66 of an electric or other rotary motor 67.

Fluid jet nozzles 68 and 69 are disposed at opposite end portions of the table 56 and are so positioned relatively to the table as to direct the jet or fluid issuing therefrom crosswise of such a table. The nozzle 68 is a trash disposal nozzle and the nozzle 69 is for discharging the peeled meat from the table 56.

Pipes 70 and 71, respectively, couple the nozzles 68 and 69 to displaced points in a valve casing 72 which contains a reciprocating plunger valve actuated by a plunger rod 74 which is coupled to one of the yoke arms 58. A fluid pressure supply pipe 75 is connected to the valve casing 72 at a point intermediate the connections of the pipes 70 and 71.

A trash discharge flume 76 is disposed opposite the jet nozzle 68 and peeled meat discharge flume 77 opposite the jet nozzle 69.

In operation the crustaceans are placed upon the table 56 as indicated in FIGURE 5 with the tails toward the peeling nip. The motor 67 being put in operation, the yoke is swung from the position of FIGURE 5 to that of FIGURE 8, and in so doing the roller 20$^c$ rolls across the table 56, pinching the meat from the shells and pulling the shells and trash through the nip as indicated in FIGURE 7. Such trash and shells are blown by the fluid pressure nozzle 68 across the table and into the discharge flume 76.

At the same time the peeled meat is pushed across the table 56 toward the right in advance of the moving roller 20ᶜ, and after the roller retires backwardly to the position of FIGURE 5 the fluid under pressure issues from the jet nozzle 69 to remove the peeled meat from the table 56 and into the discharge flume 77.

FIGURE 9 which is the position of the valve when the roller is as illustrated in FIGURE 7, places the source of fluid pressure 75 in communication with the pipe 70 leading to the trash disposal nozzle 68.

When the roller rocks back to the position of FIGURE 5 the valve 73 is shifted to the position of FIGURE 8 closing the port to the pipe 70 and opening communication from the source 75 to the pipe 71 communicating with the jet nozzle 69.

While the roller 20ᶜ is under the compulsion of the rocker frame to move back and forth across the table 56, the springs 63 exert an elastic pressure through the trunnions 61 upon the roller to add this pressure to the gravity weight of the roller as an implement for peeling the crustaceans.

Referring more particularly to FIGURES 10 to 12 inclusive, one or more peeling rollers 20ᵈ and 20ᵉ are employed in connection with an endless conveyer belt 78 which moves continuously over rollers 79 and 80 journaled in the frame 81. A table or support 82 is disposed beneath the unsupported upper run of the flexible conveyer belt 78 which may be of rubber, rubber composition fabric or the like. The support 82 constitutes a backing with the roller to form a peeling nip for the peeling of shrimp.

The conveyer 78 is driven continuously in one direction as by a belt drive 83.

The trunnions 84 of the rollers 20ᵈ and 20ᵉ are journaled in bearings 85 upon rods 86 slidably telescoped into tubes 87 which radiate from a shaft 88.

This shaft 88 is journaled in bearings 89 supported by brackets 90 on the frame 81. This shaft 88 is driven continuously in one direction by the belt or other drive 91. The arrows show the direction of the motion.

Limit pins 92 carried by the rods 86 play back and forth in slots 93 of the tubes 87. Coil springs 94 are disposed in the tubes 87, abutting at one end against the rods 86 and at the other end against the shaft 88 whereby to cushion the rollers and to impose an elastic pressure of the rollers upon the belt 78 above the table 82 to aid in the peeling of the shrimp or crawfish.

The belt 78 is driven continuously in one direction while the rollers revolve about the shaft 88 continuously in one direction so that each roller is alternately moved into contact with the belt and rolled therealong for a predetermined distance whereupon it is lifted from the belt to the position shown in FIGURE 12 leaving the belt free of any rollers and therefore permitting the peeled meat to move along the belt to a point of discharge at the roller end 79, at which end may be arranged a spray pipe 29ᵈ for spraying water or other liquid upon the outer surface of the belt to remove slime and the like.

In the upper position of the rollers, that is the position where the roller is out of contact with the belt, the coil springs 94 will project the rods 86 outwardly until the pins 92 come into contact with the outer ends of the slots 93. This position is shown in FIGURE 11 and also as to the roller 20ᵉ in FIGURES 10 and 12.

As the rollers descend in their revolving movement against the belt the springs 94 will be gradually compressed, as indicated by the positions of the pins 92 of the rollers 20ᵈ in FIGURE 10. Thus the rollers are under the compression of the springs 94 during their rolling contact along the belt 78.

According to this form of the invention both the trash and the peeled meat are removed together at the roller end 79 of the belt so that a subsequent separation must be later undertaken.

Referring more particularly to that form of invention shown in FIGURES 13 and 14, 20ᶠ shows a resilient roller having a cut-away portion 95 operating in conjunction with an endless belt 96 trained over rollers 97 and 98. Both rollers 20ᶠ and 97 are positively driven by the intermeshing pinions 99 and 100 from the belt or other drive 101.

In the operation of this form of the invention, FIGURE 13 shows the peeling position of the upper peeling roller 20ᶠ in which the circular or cylindrical surface of this upper roller is in contact with the belt 96, forming therewith and with the backing roller 97 a peeling nip in which the crawfish or other crustaceans are subjected to a pinching or other peeling action drawing the removed shells and trash through the nip to the discharge side of the rollers while the meat is squeezed outwardly to the feed side of the rollers. This peeling action continues as long as the round or cylindrical surface of the roller 20ᶠ is in contact with the belt 96 above the roller 97 but as soon as the roller 20ᶠ moves to the position of FIGURE 14 the cut-away portion 95 of this split roller 20ᶠ is moved into position above the roller 97, at which time a gap or opening is created between the belt and the roller 20ᶠ. As the belt 96 continues to move in the same direction the peeled meat will pass through this gap or opening and be delivered over the discharge end of the belt 96.

Referring more particularly to FIGURES 15 and 16, an elastic roller 20ᵍ operates in conjunction with a belt 96ᵃ trained about rollers 97ᵃ and 98ᵃ in much the same fashion as described in connection with FIGURES 13 and 14, the belt and roller 97ᵃ being driven by belt drive 101ᵃ or other mechanism as desired. Roller 20ᵍ is driven through frictional contact between cam 108 and follower 107.

The trunnions 102 of roller 20ᵍ are journaled in arms 103 connected by pivots 104 to upstanding brackets 105 of a frame 106. The ends of the roller 20ᵍ are provided with follower bands 107 which track around about the edges of cams 108 on the ends of the roller 97ᵃ. The high points of the cams are indicated at 109. A spring 110 will aid gravity in holding the roller 20ᵍ down upon the belt and the bands 107 upon the edges of the cams 108.

In operation, the peeling position is shown in FIGURE 15 in which the resilient pressure of the spring 110 aids the gravity weight of roller 20ᵍ in imposing requisite pressure at the peeling nip upon the crustaceans, the shells being pulled through the nip and the meat rejected in front thereof. When the high points of the cams 109 arrive beneath the bands 107, the top roller 20ᵍ will be raised from the nip leaving an opening for the passage of the meat so that the meat may be discharged over the end of the belt. In this position (FIGURE 16) the springs 110 are distended and after the high points 109 of the cams pass the springs 110 will draw the roller 20ᵍ back into nip position.

Although we have disclosed herein the best form of the invention known to us at this time, we reserve the right to all such modifications and changes as may come within the scope of the following claims.

What is claimed is:

1. A machine for peeling crawfish and the like comprising a support on which crawfish are adapted to be placed in rows only in timed and spaced intervals, a peeling roller forming a peeling couple with the support, drive means for moving the peeling couple to peel the crawfish, and removal means for removing the peeled meat from the support between the rows.

2. The machine of claim 1 in which the last-mentioned means comprises spaced openings in the support.

3. The machine of claim 1 in which the support is an endless belt having spaced openings with lands between the openings for receiving thereon the crawfish.

4. The machine of claim 1 in which the last-named means comprises spaced openings in the support for the evacuation of the peeled meat, with means below the openings for carrying off the peeled meat.

5. The machine of claim 1 in which the support is an endless belt having spaced openings therethrough and in which the drive means is applied to cause the support to travel to the peeling roller, and a discharge flume below the belt adjacent the roller for receiving the peeled meat through the openings.

6. A machine for peeling crawfish and the like comprising at least two relatively movable peeling members of which one member is a support, means for aligning in rows crawfish on said support with the rows separated in space with reference to the direction of relative travel of the peeling members, means for bringing said peeling members into peeling relation with the aligned crawfish at periodic intervals with respect to the relative linear travel of said members, and discharge means positioned relatively to the members for discharging the peeled meat from the machine.

7. The machine of claim 6 in which at least one of the peeling members is a roller, and said discharge means is a conveyer belt trained at one end about said peeling roller, and means connected to drive the belt in forward and reverse directions of movement to alternately feed the raw crustaceans to the nip and withdraw the peeled meat to a point of removal.

8. The machine of claim 7 further comprising normally inoperative peeled meat removal means positioned relatively to the belt to remove the meat therefrom, and operative means for the last-named means in timed relation to the reversing means.

9. The machine of claim 6 in which the discharge means comprises means for creating a gap at the nip to permit the slick peeled meat to pass.

10. The machine of claim 9 in which the gap is created by a roller having a cutaway portion.

11. The machine of claim 9 in which the gap creating means is a cam for periodically moving at least one peeling member away from nip position.

12. The machine of claim 6 in which the peeling members are respectively a roller and a substantially flat support, with said discharge means being dual, one for the trash at one end portion of the support and one for the peeled meat at the other end portion of the support, with associated activating means connected to the roller and dual discharge means to activate the latter alternatively in relation to the positions of the roller.

13. The machine of claim 6 in which one of the peeling members is an elongated support and the other member a revolving roller periodically wiping across a part at least of the support to provide the nip.

14. The machine of claim 13 further comprising a rotary frame carrying the revolvable roller cyclically into and out of contact with the support and having means to yieldably project the roller to an outer position in the frame during intervals of non-contact with the support and to permit the roller to move inwardly of the projected position when contacting the support to place the last-named means under compression.

References Cited in the file of this patent

UNITED STATES PATENTS

| Number | Name | Date |
|---|---|---|
| 2,637,065 | Lapeyre et al. | May 5, 1953 |
| 2,660,754 | Roshko | Dec. 1, 1953 |
| 2,663,900 | Greiner et al. | Dec. 29, 1953 |
| 2,683,281 | Yanus et al. | July 13, 1954 |
| 2,712,152½ | Samanie | July 5, 1955 |
| 2,781,544 | Skrmetta | Feb. 19, 1957 |
| 2,785,435 | Lapeyre et al. | Mar. 19, 1957 |